April 20, 1948.　　　F. C. ANDERSON　　　2,440,163
BATTERY CHARGING APPARATUS AND METHOD
Filed May 16, 1946
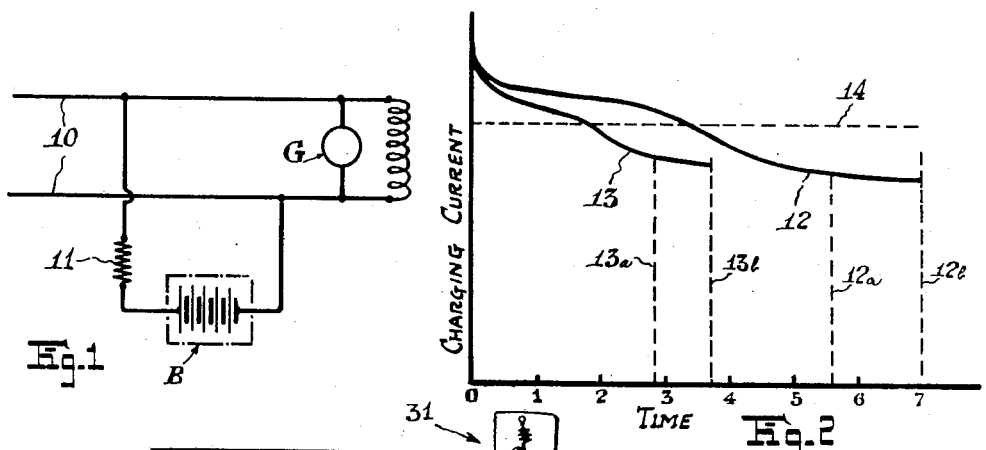
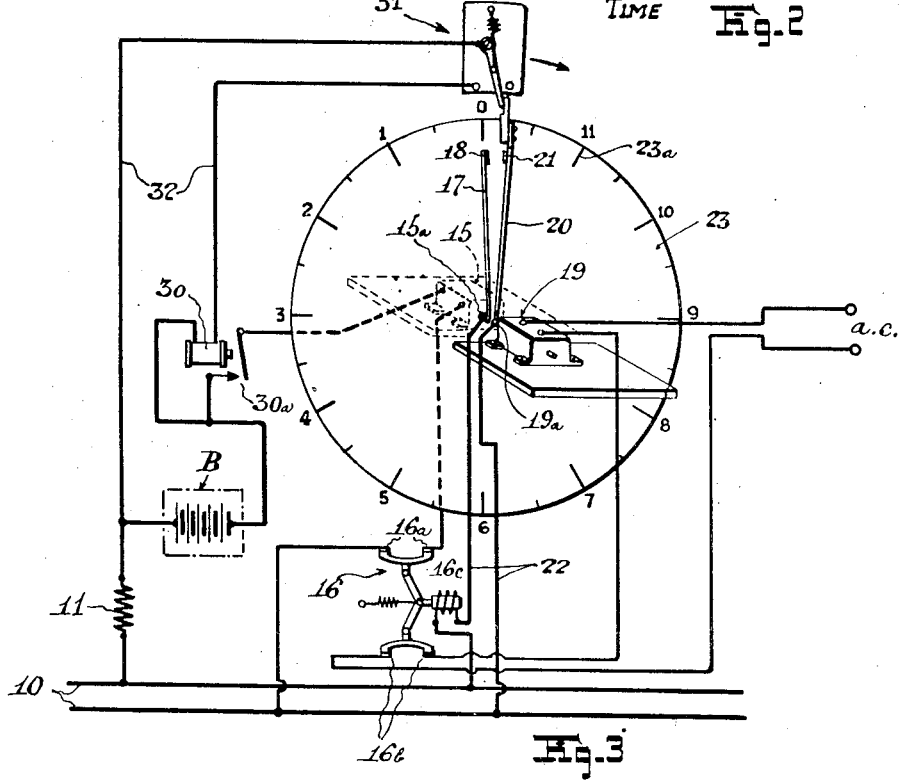
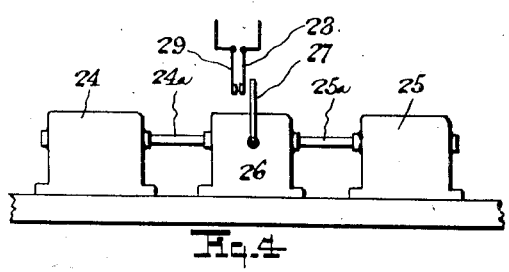
INVENTOR
Fayette C. Anderson
By Henry Canahan
ATTORNEY Patented Apr. 20, 1948

2,440,163

UNITED STATES PATENT OFFICE 2,440,163

BATTERY-CHARGING APPARATUS AND METHOD

Fayette C. Anderson, West Orange, N. J., assignor to Thomas A. Edison, Incorporated, West Orange, N. J., a corporation of New Jersey Application May 16, 1946, Serial No. 670,230

15 Claims. (Cl. 320—30)

This invention relates to a novel method of and apparatus for terminating the charge of a storage battery, and has for an object to terminate the charge automatically when the battery reaches a predetermined state of charge, without requiring that the state of discharge of the battery be measured or predetermined in any way and without requiring any supervision by an attendant during the charging period.

My invention is applicable to the taper-current methods of charging batteries including both the modified constant-voltage method and the constant-voltage method. However, since the modified constant-voltage method is by far the more practical and the more widely used, my invention is herein particularly described in connection with this method but without intending any unnecessary limitation thereto. In the modified constant-voltage method, the battery is charged from a source of constant voltage through a fixed resistance. This method of charging batteries is particularly well suited to both the nickel-iron-alkaline and the lead-acid types.

It is a further object of my invention to provide a novel method of and apparatus for terminating the charge of batteries which are charged by the taper-current methods.

It is another object to provide a wholly automatic charging apparatus of the character mentioned which is controlled automatically according to the inherent charging characteristics of the batteries.

It is another object to provide a novel and automatic apparatus for indicating the amount of charge supplied to the batteries and/or the elapsed charging time.

It is another object to provide a charging apparatus that can be set to begin operation after the elapse of a pre-selected time interval.

It is another object to provide a simple and dependable apparatus for carrying out the aforestated objectives.

Other and allied objects and features of my invention will be apparent from the following description and the appended claims.

In the description of my invention reference is had to the accompanying drawings, of which:

Figure 1 is a simple schematic drawing illustrating a modified constant-voltage method of charging;

Figure 2 is a set of typical charging curves illustrating the variation in the charging rate with time for a battery having different initial states of discharge;

Figure 3 is a diagrammatic view of circuits and mechanism for charging a battery according to my invention; and Figure 4 is a diagrammatic view illustrating a modified apparatus for carrying out my invention.

One of the problems in maintaining storage batteries used in cycle services, such as industrial truck services, is to recharge the batteries automatically without having to predetermine their states of discharge. By the present invention this is accomplished effectively by a simple apparatus which charges the batteries according to the well-known modified constant-voltage principle. This charging method is carried out, as illustrated in Figure 1, by connecting the battery B to be charged through a fixed resistance 11 to a constant-voltage charging line 10 supplied by a direct-current generator G. As the charge progresses, the charging current is tapered—i. e., gradually reduced. When the values of the voltage of the charging line and of the series resistance are properly chosen the charge rate never exceeds a safe value. Also, these values determine the time required to complete the charge.

In Figure 2 there are shown typical time-rate charging curves for a battery charged by the modified constant-voltage method, curve 12 being for the battery when it is initially nearly completely discharged and curve 13 for the same battery when initially about half discharged. Because the battery voltage is at first low the initial charging rate is high, but as the charge progresses the battery voltage increases and the charging current falls to a minimum value. It has been found that if a battery is recharged again and again from the same line voltage and through the same series resistance to any one state of charge which is within a range between a minimum charge which equals substantially the ampere hours taken out of the battery on discharge and a maximum charge which equals this minimum charge plus an aproximately 20% overcharge to compensate for losses, then the charging current always averages substantially the same rate over the charge period irrespective of the initial state of discharge of the battery. In Figure 2 the abovestated minimum and maximum charge conditions for the curves 12 and 13 are designated approximately by the dotted vertical lines referred to by the numbers of the curves with the suffix letters $a$ and $b$. Also, in Figure 2 the average fixed rate of the charging curves 12 and 13 over the period for a complete charge is designated approximately by the dotted line 14.

It follows from the relationships stated in the foregoing paragraph that irrespective of the initial state of discharge of the battery, the area below the actual charging curve—which may be termed the time-rate integral of that curve—is equal substantially over the charge period to the area below the average charge line—or time-rate integral of the average rate over the same charge period. By my invention I have utilized this common characteristic to terminate automatically the charge of the battery when the battery reaches the desired preselected state of charge.

It may be noted that a storage battery, particularly one of the nickel-iron-alkaline type, works most efficiently when it is charged at a so-called "normal" rate. If such a battery is charged at or above this normal rate, or at a rate which at least averages the normal rate over the charging period, the battery will give efficient service continuously regardless of whether the rate at which it is discharged is below or above the normal charge rate. Accordingly, the charge rate should ordinarily be chosen so that it will average the normal specified rate for each particular cell for the time required for a complete charge. For each such cell this rate is established solely by the voltage of the charge line and the value of the series resistance, and is independent of the state of discharge of the cell. It is to be understood, however, that my invention is not limited to charging batteries at the normal rate but is applicable to charging batteries generally at any specified average rate.

In Figure 3 there is illustrated one form of control apparatus for terminating the charge in accordance with my invention. The battery B to be charged is here connected to the constant-voltage line 10 through the fixed resistance 11 aforementioned. Additionally, the charging circuit includes serially a pair of contacts 30a of a relay 30, a D.-C. motor 15 and a pair of contacts 16a of a circuit breaker 16. The motor 15—which may be a form of ampere-hour meter—is coupled through suitable reduction gearing to a shaft 15a and drives that shaft in a counter-clockwise direction, as viewed in Figure 3, at a speed which is proportional continuously to its energizing current, which is the charging current for the battery B. Adjustably mounted on the shaft 15a, as by a friction coupling not shown, is an arm 17, and mounted on the outer end of this arm is an electrical contact 18. Axially in line with the motor 15 is a constant-speed motor 19, typically a small synchronous motor, which is supplied with A.-C. power from a suitable power source not shown through a line that includes a pair of contacts 16b of the circuit breaker 16. The motor 19 is coupled also through suitable reduction gearing not shown to a shaft 19a and drives that shaft also in a counterclockwise direction as viewed in Figure 3. Mounted also adjustably on this shaft, as by a friction coupling not shown, is an arm 20 which carries an electrical contact 21. The contact 21 is moved in the same plane as is the contact 18 and lies in a clockwise direction from, or lags behind, that contact. These contacts 18 and 21 constitute a switch which is serially included in an energizing circuit 22 for the coil 16c of the circuit breaker 16.

The speed of the motor 19 is set so that it is equal to the speed of the motor 15 when the charging current is at its average value. Since this average selected value of the charging current is established by the values selected for the voltage of the charge line and the resistance of the series resistor 11, the speed at which the motor 19 is to be set may be determined from these values and the factor which expresses the proportionality between the speed of the motor 15 and its energizing current.

The arms 17 and 20 move across a dial 23 which may be calibrated in equal divisions 23a in terms of ampere hours and/or time, as is hereinafter explained. To put the apparatus into operation the arm 17 is preferably set at zero on the dial—the position it occupies in Figure 3—the arm 20 is set at a distance in a clockwise direction from the arm 17 and the circuit breaker 16 is closed to start the motor 19. The arm 20 is now turned counterclockwise but the arm 17 remains at rest because the charging circuit is initially held open by the relay contacts 30a. As the arm 20 approaches zero on the dial—but before the contact 21 reaches the contact 18—it trips a toggle switch 31 to close an energizing circuit 32 for the relay 30. When the relay 30 is energized it closes the charging circuit to put the battery on charge and to start the motor 15 running. The motor 15 now turns the arm 17 also counterclockwise. At first the speed of the arm 17 is faster than that of the arm 20 because the actual charging rate is then greater than the average rate, but during the latter half of the charge period when the charge rate is less than the average rate, the arm 17 loses speed relative to the arm 20. Accordingly, the gap distance between the contacts 18 and 21 increases during approximately the first half of the charging period and is gradually reduced during the remaining part of the charging period. As the contacts close, the circuit breaker 16 is energized to terminate the charge and to stop both motors 15 and 19.

It is to be noted that since the arm 17 is driven at a varying speed which is proportional continuously to the actual charging rate, the distance in movement of the arm from zero on the dial is an indication of the ampere hours of charge delivered to the battery. Likewise, since the arm 20 is driven at a speed which bears the same proportionality to the selected average rate, its distance of movement during the charge period is an indication of the ampere hours of charge which would be delivered were the battery charged continuously at that selected rate. Accordingly, when the gap distance between the contacts 18 and 21 becomes the same at the end of the charge period as it was at the start of the charge period, the actual charge rate will have averaged the selected rate over the charge period.

It may be observed that from another viewpoint the motor 15 integrates the actual charging rate over the charge period by moving the contact 18 a distance proportional to the total charge in ampere hours which is supplied to the battery, and the motor 19 integrates the average charge rate over the charge period by moving the contact 21 through a distance proportional to the charge which would be supplied were the battery charged constantly at the average selected rate. The relative variation in the distance of separation between the contacts is proportional therefore to the difference between the integrals of the actual charging rate and the average rate over the charge period. When the gap distance between the contacts becomes the same at the end of the charge period as it was at the beginning of the charge period, the time-rate integrals of the actual and the average charge rates are equal.

When the scale 23a is calibrated by equal divisions in terms of ampere hours, the arm 17 will indicate with respect thereto the total charge delivered to the battery. Also, upon properly calibrating this scale in terms of time, say hours, the arm 20 will indicate with respect thereto the time period of the charge.

By initially setting the arm 20 in a clockwise direction from the arm 17 and then closing the breaker 16 to put the apparatus into operation, the start of the charge period is delayed. It is advantageous to delay the charging of batteries taken directly from service because they are then hot and will not charge efficiently. However, by this feature of my invention such batteries may be connected to the charging apparatus as soon as they are taken from service and the beginning of the charge period will then be delayed according to the distance of backspacing of the arm 20 from zero position on the dial. When the scale 23 is calibrated in hours as above-mentioned, the delay may be read directly on the scale. Typically this delay may be two or three hours as it will allow ample time for the batteries to cool before the charging apparatus is put into operation. At the expiration of this delay period, the arm 20 will be near zero on the dial and will trip the toggle switch 31 to start the charging apparatus as hereinbefore explained.

The present apparatus may be set to control the overcharge in two different ways. One of these, which is preferred in charging the nickel-iron-alkaline type of cell, comprises initially setting the contacts 18 and 21 with a minimum gap and adjusting the speed of the arm 20 so that it is equal to that of the arm 17 when the charge circuit is at a specified rate which is the average charge rate over the period required to supply the battery with the ampere hours taken out on discharge plus a suitable overcharge. By this mode of operation the battery is given a varying overcharge depending upon the initial state of discharge of the battery but which is in each case equal approximately to a given percentage of the ampere hours taken out of the battery on discharge. A second way of controlling the overcharge, which is particularly suitable to the lead-acid battery, comprises initially setting the contacts 18 and 21 with a relatively wide gap and adjusting the speed of the arm 20 so that it is equal to that of the arm 17 when the charging current is at its average rate over the period required to supply the battery with only a minimum charge—a charge equaling the ampere hours taken out on discharge. In this instance the battery will receive the minimum charge plus a fixed overcharge according to the initial setting of the gap between the contacts 18 and 21. The overcharge is now independent of the initial state of discharge of the battery. In carrying out this second mode of controlling the overcharge, the arm 20 is backspaced to provide the desired gap distance between the contacts and then the circuit breaker 16 and the switch 31 are manually closed to start the charge period running. If it is desired to so control the overcharge while providing a delay in the start of the charge period, the switch 31 may be shifted clockwise with respect to zero on the dial by the distance necessary to provide the desired gap between the contacts when the switch is thrown by the arm 20. For this purpose the switch may be suitably movably mounted as indicated in Figure 3. The arm 20 will then be backspaced from the switch 31 to provide the desired delay in starting the charge period. In this case the system will be put into operation simply by closing the circuit breaker 16.

In Figure 4 there is illustrated diagrammatically an alternate control apparatus for terminating the charge according to my invention. Here 24 represents an ampere-hour meter corresponding to the motor 15 of Figure 3, and 25 represents a constant-speed motor corresponding to the motor 19 of the above figure. These motors have shafts 24a and 25a respectively of which the shaft 24a is turned at a speed varying in predetermined relation to the charging current and the shaft 25a is turned at a fixed speed bearing the same relation to the average charging rate. These shafts are connected through a standard differential gearing 26 to a pivoted control arm 27 so as to drive this arm in accordance with the relative movement between the shafts 24a and 25a. For example, when the shafts 24a and 25a are turned at the same speed the arm 27 stands still; when the shaft 24a is turned at a higher speed than the shaft 25a the arm 27 is turned clockwise as it appears in Figure 4; and when the shaft 25a is turned at a higher speed the arm is turned counterclockwise. Mounted in the path of the control arm 27 is a movable electrical contact 28 and spaced counterclockwise from that contact with respect to the arm is a semistationary contact 29. These contacts are connected in the control circuit 22 (Figure 3) so as to cause the charging circuit to be opened and the motor 25 to be stopped when the contacts are closed. Of course with this apparatus there may be associated a suitable indicating means operated by the motor 24 to indicate the total charge put in the battery.

In operating this second embodiment, the control arm 27 is set initially at a predetermined distance from the movable contact 28. The charging circuit is then closed through the motor 24 and concurrently the motor 25 is started. During the initial charging period when the actual charge rate is greater than the average rate the control arm 27 is moved clockwise away from the contact 28. During the final charging period when the actual rate is below the average the arm 27 is returned in counterclockwise direction to close the contacts 28 and 29 and terminate the charge.

I have herein particularly described my invention in terms of certain preferred embodiments but it will be understood that these embodiments are illustrative and not limitative of my invention as the same is subject to changes and modifications without departure from the scope of my invention, which I endeavor to express according to the following claims.

I claim:

1. In charging a battery in accordance with the taper-current principle: the method comprising producing a varying quantity during charging according to the difference between the time-rate integrals of the actual charging rate and a selected average charging rate, and controlling the termination of the charge by said quantity.

2. In charging a battery in accordance with the taper-current principle wherein the actual charging rate averages a selected rate over the time required to bring the battery to a given state of charge: the method comprising setting a quantity at a predetermined value, varying said quantity according to the difference between the time-rate integrals of the actual charging rate and said selected rate, and controlling the termination of the charge by said quantity.

3. In charging a battery in accordance with the modified constant-voltage principle wherein the actual charging rate averages a selected rate over the time required for a complete charge: the method comprising physically integrating the actual charge rate and said selected rate during the time of charging, and opening the charging circuit when the integrals reach predetermined relative values.

4. In charging a battery in accordance with the taper-current principle wherein the actual charging rate averages a selected rate over the time required for a given charge: the method comprising driving two motors at speeds corresponding to said actual charging and selected rates respectively, varying a control quantity according to the relative turning movement of said motors, and causing said control quantity to terminate the charge when the battery is substantially fully charged.

5. In a battery-charging apparatus operating by the taper-current method: the combination of terminating means for placing said battery-charging apparatus out of operation; means moved at a substantially constant speed in predetermined relation to the average rate of charge of said apparatus over a preselected charge period; means moved at a varying speed in predetermined relation to the actual rate of charge of said apparatus; and means, controlled by said last two stated means in response to their relative movement, for rendering said terminating means effective.

6. In a battery-charging apparatus including a source of constant voltage and a fixed resistance in series therewith for adapting the apparatus for operation by the modified constant-voltage method: the combination of a first means driven at varying speed according to the actual charging rate; a second means predominantly set in relation to said first means and driven during charging at a substantially fixed speed according to the average of said actual charging rate over the time required to charge the battery; and means, responsive to said two drive means upon the same reaching a predetermined relative positioning, for rendering said terminating means effective.

7. In a battery-charging apparatus including a source of constant voltage and a fixed resistance in series therewith for adapting the apparatus for operation by the modified constant-voltage method: the combination of circiut means including a pair of electrical contacts and adapted upon operation of said contacts to open the charging circuit of said apparatus; a first means driven at a varying speed according to the actual charging rate of said apparatus; a second means driven at a substantially constant speed in the same direction as is said first means; and means, controlled by said two driven means according to their relative movement, for operating said contacts.

8. The combination set forth in claim 7 including means associated with said first driven means for indicating the amount of charge delivered by said apparatus.

9. The combination set forth in claim 7 including means associated with said second driven means for indicating the length of the charge period.

10. In a battery-charging apparatus adapted to operate according to the taper-current principle: the combination of a first means driven in a given direction at varying speed proportional continuously to the actual charging rate; a second means driven during charging at a constant speed proportional to the average of said actual charging rate over the time required to bring the battery to a predetermined state of charge, said second means being initially set at a distance from said first means; means for starting said second driven means; means controlled by said second driven means and operated upon the elapse of an interval of time depending on the initial setting of said second means, for starting said first means and putting said charging apparatus in operation; and means operated jointly by said first and second means following the start of said first means, for putting said charging apparatus out of operation.

11. In a battery-charging apparatus adapted to operate according to the taper-current principle: the combination of a first electrical contact driven in a given direction during charging at a varying speed proportional continuously to the actual charging rate; a second contact driven in the same direction during charging at a constant speed proportional to the average of said actual charging rate over the charge period, said second contact being initially set at a lagging distance behind said first contact; means for driving said second contact; means associated with said second contact and operated when said second contact reaches a preselected gap distance from said first contact for driving said first contact; and means controlled by said contacts upon their closing for terminating the charge.

12. In a battery-charging apparatus including a source of constant voltage and a fixed resistance in series therewith for adapting the apparatus for operation by the modified constant-voltage method: the combination of variable-speed means moved at a varying rate in predetermined relation to the charging current delivered by said apparatus, a constant-speed means moved at a rate in the same relation to the average charging rate of said apparatus over the charge period, and control means for said apparatus operated by said variable- and constant-speed means according to their relative movement and predeterminately set for placing said apparatus out of operation when the charge which would be produced at said average rate exceeds the actual charge by a predetermined amount.

13. In a battery-charging apparatus including a source of constant voltage and a fixed resistance in series therewith for adapting the apparatus for operation by the modified constant-voltage method: the combination of a motor having a variable speed according to its energizing current and connected in the charging circuit of said apparatus; a constant-speed motor driven during charging at a speed corresponding to the average charging rate of said apparatus over a normal charge period; and means, actuated by said motors in response to their relative movement, for opening said charging circuit and shutting off said constant-speed motor.

14. In a battery-charging apparatus including a source of constant voltage and a fixed resistance in series therewith for adapting the apparatus for operation by the modified constant-voltage method: the combination of a contact moved in a given direction at varying rate of speed according to the variation in the charging current, a second contact initially set behind said first contact and moved in the same direction at a fixed rate of speed according to the value of the average charging rate over the time required to bring the battery to a predetermined state of charge, and means responsive to the closing of said contacts for opening the charging circuit of said apparatus.

15. In a battery-charging apparatus including a source of constant voltage and a fixed resistance in series therewith for adapting the apparatus for operation by the modified constant-voltage method: the combination of a motor driven at varying speed according to the variation in the charge current, a second motor driven at a fixed speed according to the average charge rate over the time required to bring the battery to a predetermined state of charge, a control arm, differential gearing coupling said motors to said arm, and means controlled by said arm for opening the charging circuit of said apparatus and stopping said motors.

FAYETTE C. ANDERSON.

REFERENCES CITED

The following references are of record in the file of this patent:

UNITED STATES PATENTS

| Number | Name | Date |
| --- | --- | --- |
| 1,033,508 | Woodbridge | July 23, 1912 |
| 1,121,892 | Beach | Dec. 22, 1914 |
| 1,203,552 | Berry | Oct. 31, 1916 |
| 1,677,644 | Lomax | July 17, 1928 |
| 1,699,128 | Warren | Jan. 15, 1929 |
| 1,812,628 | Geiger | June 30, 1931 |
| 1,906,439 | Warren | May 2, 1933 |

FOREIGN PATENTS

| Number | Country | Date |
| --- | --- | --- |
| 274,483 | Germany | May 22, 1914 |